(12) United States Patent
Curtiss

(10) Patent No.: US 6,172,481 B1
(45) Date of Patent: Jan. 9, 2001

(54) METHOD AND APPARATUS FOR RAPID CHARGING BATTERIES UNDER SUB-OPTIMAL INTERCONNECT CONDITIONS

(75) Inventor: Troy Curtiss, Erie, CO (US)

(73) Assignee: Qualcomm Incorporated, San Diego ( * ) Notice: Under 35 U.S.C. 154(b), the term of this patent shall be extended for 0 days.

(21) Appl. No.: 09/389,291

(22) Filed: Sep. 2, 1999

(51) Int. Cl.$^7$ ........................................... H02J 7/00
(52) U.S. Cl. ................................... 320/127; 320/128
(58) Field of Search ................................. 320/127, 128, 320/132, 151, 152

(56) References Cited

U.S. PATENT DOCUMENTS

| | | | |
|---|---|---|---|
| 4,203,059 | 5/1980 | Kraus | 307/140 |
| 5,883,497 | 3/1999 | Turnbull | 320/132 |
| 5,900,717 | 5/1999 | Lee | 320/150 |
| 6,037,749 | 3/2000 | Parsonage | 320/132 |

Primary Examiner—Peter S. Wong
Assistant Examiner—Lawrence Luk
(74) Attorney, Agent, or Firm—Philip R. Wadsworth; Raymond Hom

(57) ABSTRACT

A method and apparatus for rapid charging a battery that compensates for sub-optimal interconnection between the charger and the battery. In the present invention the effect of an imperfect interconnection between a charger and a battery is empirically characterized. The elements of the imperfect interconnection include any resistive losses between the battery charger output and the battery cells. The battery charger incorporates a control loop that measures the current flowing into the battery and the voltage at the interconnect terminals. The control loop then calculates the voltage at the actual batteries based on the measured values and the predetermined interconnect characterization. The control loop uses the calculation to adjust the output of the charger to achieve the optimal voltage at the batteries. The result of optimizing the charging voltage is a significant charge time reduction.

15 Claims, 3 Drawing Sheets

METHOD AND APPARATUS FOR RAPID CHARGING BATTERIES UNDER SUB-OPTIMAL INTERCONNECT CONDITIONS

BACKGROUND OF THE INVENTION

I. Field of the Invention

The present invention relates to battery chargers. More particularly, the present invention relates to a novel and improved method and apparatus for rapid charging of batteries that compensates for sub-optimal interconnection between the charger and the batteries.

II. Description of the Related Art

The availability of radio frequency (RF) spectrum has led to the proliferation of wireless communication devices. One primary advantage of wireless communication devices is portability. Wireless communication devices can be used without being tethered by power cords or wire line links. The wireless communication device portability imposes a requirement for a portable power source. Batteries supply the portable power source for wireless communication devices.

Many types of battery designs are available. The choice of a particular battery type is determined by the application. Factors that contribute to the determination of battery type include required device supply voltage, peak current capability, storage capacity, recurring costs, and physical constraints. For a wireless communication device such as a wireless phone, a rechargeable battery is required.

There are three basic types of rechargeable batteries that can satisfy the design constraints imposed on a wireless phone battery. The three battery types are Nickel Cadmium (NiCad), Nickel Metal Hydride (NiMH), and Lithium Ion (Li-Ion). Each battery type has inherent advantages and disadvantages.

The NiCad battery is the least expensive and the most common rechargeable battery type. A single NiCad cell has a voltage of approximately 1.2 volts. A number of individual NiCad cells are stacked in series in order to achieve the required wireless phone supply voltage. The NiCad battery is fairly forgiving with respect to the voltage tolerance of the charger. However, NiCad technology presents two disadvantages. The capacity of a NiCad battery is lower than a NiMH or Li-Ion battery of the same size or weight. Moreover, the NiCad battery suffers from capacity degradation if subject to numerous recharge cycles where the battery was not fully discharged prior to recharging. This memory effect is particularly troublesome in a wireless phone application since the user typically does not fully discharge the battery before recharging it. Rather, the user typically will replace the battery within the charger at the end of each day regardless of the amount of use the phone incurred during the day. This routine is typically followed to insure the user has a fully charged battery at the start of each day. Starting each day with a fully charged battery minimizes the probability that communication will be lost or that a connection cannot be made due to a lack of battery power. Unfortunately, the routine of recharging a partially discharged battery at the end of each day maximizes the degradation of the capacity of a NiCad battery due to memory effects.

The NiMH battery does not suffer from memory effects when recharged prior to full discharge. The cost of a NiMH battery is higher than that of a NiCad battery but the energy density of a NiMH battery is slightly higher than that of a NiCad battery. Like the NiCad battery, a single NiMH cell has a voltage of approximately 1.2 volts. To achieve the required supply voltage of a wireless phone a number of cells must be stacked in series. The NiMH battery has been used as an alternative to the NiCad battery in wireless telephones.

The Li-Ion battery is presently the most costly rechargeable battery used in wireless phone applications. However, this disadvantage is more than offset by the many advantages a Li-Ion battery offers over the other two battery types. A Li-Ion battery does not suffer from capacity degradation due to memory effects when recharged prior to full discharge. Additionally, the Li-Ion battery has the highest energy density of the three rechargeable battery types discussed. The energy density of the Li-Ion battery is nearly twice that of a NiCad battery. This is especially important in wireless phone applications where there is an emphasis on increased phone talk and standby times with a corresponding emphasis on small size and light weight. A single Li-Ion cell has a cell voltage of approximately 4.1 volts. The high cell voltage eliminates the need to series stack multiple Li-Ion cells to achieve the supply voltage required in a wireless phone.

Regardless of the rechargeable battery chemistry used, a battery pack is typically custom designed for a particular wireless phone application. Because of the stringent size constraints put on wireless phones a standardized battery pack configuration is not feasible. Each battery pack is designed according to the form factor allocated within a particular wireless phone.

The corresponding battery chargers are custom designed for each wireless phone application. The battery charger is designed such that a battery can be recharged while housed within the phone. An additional slot is often provided to allow a battery pack to be charged simultaneously. This allows the user to have a fully charged spare in case the battery installed in the phone becomes fully discharged and the user cannot wait for a complete recharge cycle.

The battery recharge time is largely a function of the battery charger design. A battery charger is a Constant Current-Constant Voltage (CC-CV) power supply. A CC-CV power supply is able to operate in either constant current or constant voltage mode. The power supply provides power to the battery until either a current limit or voltage limit is reached. When a discharged battery is initially placed in the battery charger the voltage of the battery is extremely low. As a result, the power supply in the charger will reach its current limit before it reaches its voltage limit. The voltage of the power supply then varies to maintain the constant current into the battery. Once the battery becomes sufficiently charged, the power supply in the charger is able to achieve the voltage limit. The voltage from the power supply then remains constant and the current from the supply decreases as the battery continues to charge. This condition is maintained until the battery becomes fully charged, at which point a constant voltage is maintained at the battery but effectively no current is sourced into the battery.

One issue addressed in designing the power supply within a battery charger for a wireless phone is the output voltage. All three battery chemistries are available for some models of wireless phones. Since both the NiCad and NiMH batteries utilize series stacked cell structures the output voltage from these batteries is determined by the number of cells combined in series. A typical wireless phone battery pack will utilize three NiCad or NiMH cells in series for an output voltage of 3.6 volts. Note however that a single Li-Ion cell has a charged cell voltage of 4.1 volts. Therefore a battery charger that can charge all three battery chemistries needs to provide at least a 4.1 volt output voltage. Fortunately, both the NiCad and NiMH batteries have moderate over voltage tolerance and are able to withstand a 4.1 volt charging voltage. On the other hand, a Li-Ion battery has very low over voltage tolerance. The power supply charging a Li-Ion battery must maintain the ultimate charging voltage to a tight tolerance. The ultimate charging voltage or top off voltage used on a Li-Ion charger is especially important because the life and capacity of the Li-Ion cell is degraded if the top off voltage varies from 4.1 volts by more than a few percent.

In addition to the charging voltage limit, the battery charger must provide a reasonable charging current limit. The three rechargeable battery chemistries have different current limitations. The current limit of the charger is designed to be below the safe operating point of each battery type. The designed current limit for typical wireless phone battery chargers is approximately one amp.

Although the battery charger may produce a 4.1 volt top off voltage the actual voltage at the battery may be significantly less than 4.1 volts for a majority of the charging time. This is due to a combination of a number of factors.

The internal configuration of the battery pack is a contributor to the charger/battery voltage differential. Most wireless phone battery packs include some form of protection circuit within the battery. The protection circuit guards against overvoltage, and provides current limiting to the battery. However, any series element within the battery pack between the battery and the charger contributes to I*R (current*resistance) voltage drops between the charger and the actual battery cell. Another contributor to voltage drop within the battery pack is the wire or circuit board connecting the battery to the charging terminals. The resistance of this length of conductor will also contribute to I*R losses.

If the battery is charged while housed within the wireless phone, the wireless phone may also contribute to voltage drops between the charger and the battery. Additional losses will occur if the battery is charged through a connector provided on the phone but no additional losses will occur if the battery is charged through the same terminals as would be used when charging the battery pack alone. An example of a condition where the phone contributes to I*R losses is where the battery is charged through a hands free car kit connection on the phone. An example where the phone does not contribute to I*R losses is where the charging terminals on the battery pack are exposed whether or not the battery pack is installed within a phone. If a battery charger utilizes these terminals whether or not the battery pack is installed within a phone, the phone will not contribute to any I*R losses.

The battery charger itself may contribute I*R losses if the charger power supply is connected to the charging terminals using wires or a circuit board. Any series element between the output of the power supply and the charging terminals will produce an I*R loss.

Finally, I*R losses will occur because of the imperfect connection between the terminals on the charger and the terminals on the battery pack.

What is required is a battery charger design that compensates for the losses between the charger power supply and the actual batteries. This will enable the battery to be charged at a faster rate without any detrimental effects on battery cycle life. Compensation of charging losses benefits the user by allowing discharged batteries to be recharged in a shorter period of time.

SUMMARY OF THE INVENTION

The present invention is a novel and improved method and apparatus for rapid charging batteries by compensating for sub-optimal interconnections between the charger and the battery.

First the charging losses within each element are characterized. These charging losses include those that are within the battery pack, losses contributed by the wireless phone, and losses attributable to the interface from the battery pack or phone to the charger. The wireless phone is used as an illustration of a common device that allows the battery to be charged while the battery pack is housed within the device. The invention is not limited to battery chargers for wireless phone battery packs but rather can be utilized in any charger application where noticeable losses between the charger and the battery are inherent in the system. Other common charging systems would be those for laptop computer batteries and video camera batteries.

Next the battery charger is designed to include an additional functional block that compensates for the charging losses. The additional functional block monitors the voltage and current supplied by the power supply within the battery charger, determines what the actual voltage potential at the battery is, and adjusts the output of the charger power supply to compensate for the losses. The control loop continually adjusts the power supply to provide real time loss compensation while the battery is being charged. The voltage and current supplied by the power supply can be monitored using analog techniques or may be sampled digitally. Similarly, the actual voltage potential at the battery or, more importantly the amount of compensation to be introduced to the power supply, can be determined using a digital processor or by adjusting a gain on an analog amplifier.

When an analog implementation is chosen, the current into the battery is determined by measuring the voltage drop across a small series resistor. The output voltage is measured within the charger at the point closest to the charger terminals. These two voltages are then input to an amplifier whose output is used by the power supply as a compensation signal. The amount of compensation is adjusted by varying the gain of the amplifier such that the compensation matches the predetermined charging losses. The actual compensation signal generated by the functional block is input to a control port on the power supply to raise or lower the supplied output voltage.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Present battery chargers for wireless phone applications use a constant current-constant voltage (CC-CV) power supply that operates without regard to system losses that reduce the voltage at the actual battery cells. The lack of compensation results in significantly longer battery charging times than could theoretically be achieved. The present invention monitors the charging conditions and provides a feedback signal to the power supply to allow it to compensate for the losses.

Figure 1:
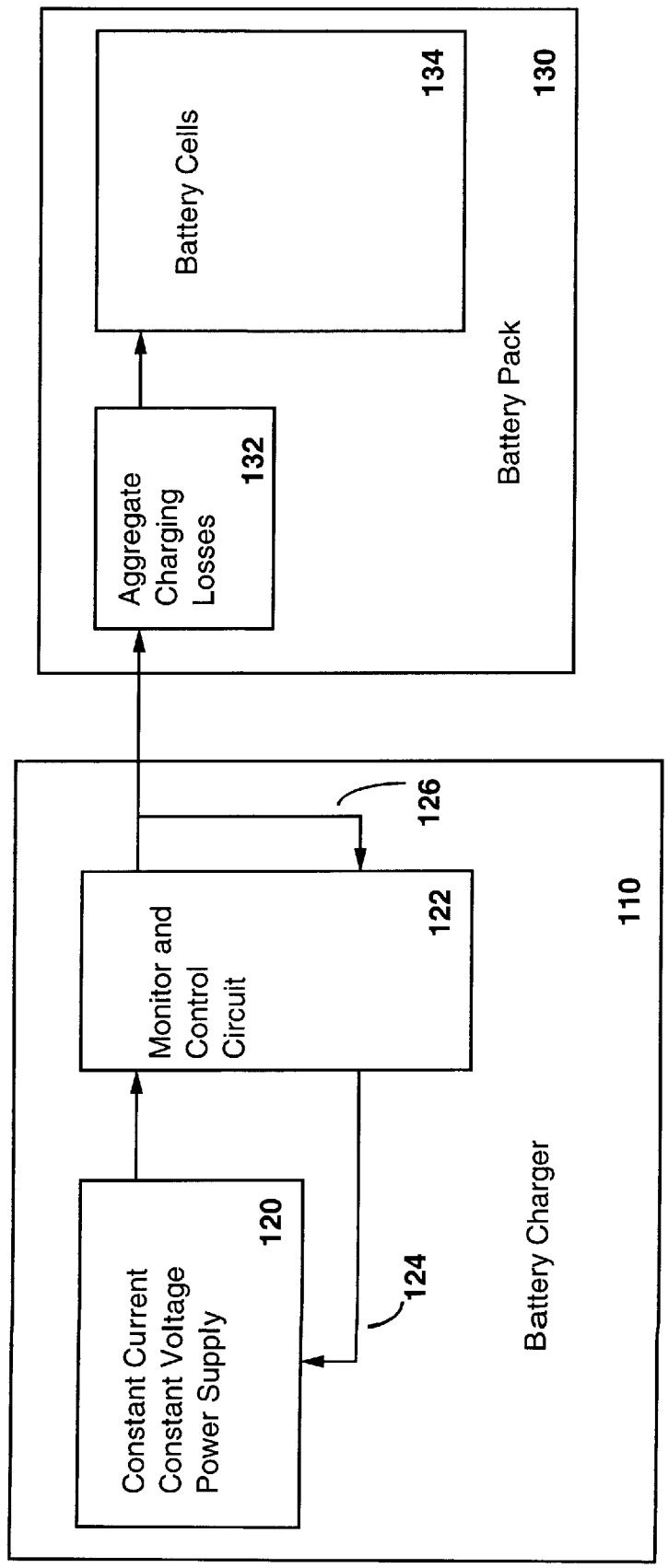
FIG. 1 is a block diagram showing a battery charging system using the present invention.

FIG. 1 is a block diagram showing a charging system consisting of a battery charger 110 interfaced to a battery pack 130. The battery charger 110 has as elements pertinent to this discussion a constant current-constant voltage (CC-CV) power supply 120 and a monitor and control circuit 122. The battery pack 130 is composed of one or more battery cells 134 and interface elements (not shown). The interface elements may include the circuit board or wires that connect the battery cells 134 to the charging terminals. Also included within the battery pack 130 are the elements of any protection circuits (not shown). The combined effects of all contributors to any charging loss are represented in a single block as the aggregate charging losses 132. The aggregate charging losses 132 include losses due to the interface connection between the battery charger 110 and the battery pack 130, any wire between the interconnection terminals and the battery cells 134, and any series components used in filtering or protection circuits. Although the aggregate charging loss 132 is depicted within the battery pack 130, it may include some contribution from losses within the battery charger 110. The aggregate charging loss 132 is shown as a single block within the battery pack 130 solely for analysis convenience. The majority of charging loss contributors is resistive and thus presents a loss that is linearly related to the charging current. However, other contributors, such as reverse polarity diodes, do not present a loss that is linearly related to charging current.

The aggregate charging losses 132 can be determined theoretically using design data and empirically by measuring a statistically sufficient sample of chargers and battery packs. The monitor and control circuit can be designed to compensate for the aggregate charging losses 132 once the aggregate charging losses 132 have been determined.

The monitor and control circuit 122 is placed in the battery charger 110 between the CC-CV power supply 120 and the battery charger 110 output. The monitor and control circuit 122 monitors the current flowing from the battery charger 110 to the battery pack 130. Additionally, the output voltage is monitored 126. The monitor and control circuit 122 then uses the real time current and voltage measurements along with the predetermined aggregate charging loss 132 information to generate a control signal 124 that is fed back to a control port on the CC-CV power supply 120.

When the CC-CV power supply 120 is operating in constant current mode the control signal 124 will have no effect. Since the CC-CV power supply 120 is already operating in a current limited condition it is unable to raise its output voltage. In constant current mode the CC-CV power supply 120 is already sourcing the maximum current that was determined to represent a safe charging level for the battery pack 130.

However, once the CC-CV power supply 120 is operating in the constant voltage mode the control signal 124 operates to compensate for the aggregate charging losses 132. The monitor and control circuit 122 provides compensation by varying the control signal 124 such that the output voltage of the battery charger 110 reduced by the predetermined aggregate charging losses 132 results in the final top off voltage at the battery cells 134. Since the aggregate charging losses 132 are due to resistive contributions the monitor and control circuit 122 must update the control signal 124 to compensate for the changing voltage potential that represents the aggregate charging losses 132.

If a constant voltage power supply were used rather than a CC-CV power supply 120 the monitor and control circuit would always control the output voltage of the power supply. However, the use of a constant voltage supply that is not current limited is not optimal for use in a battery charger 110 because of potential damage to the battery cells 134 from excessive current.

Figure 2:
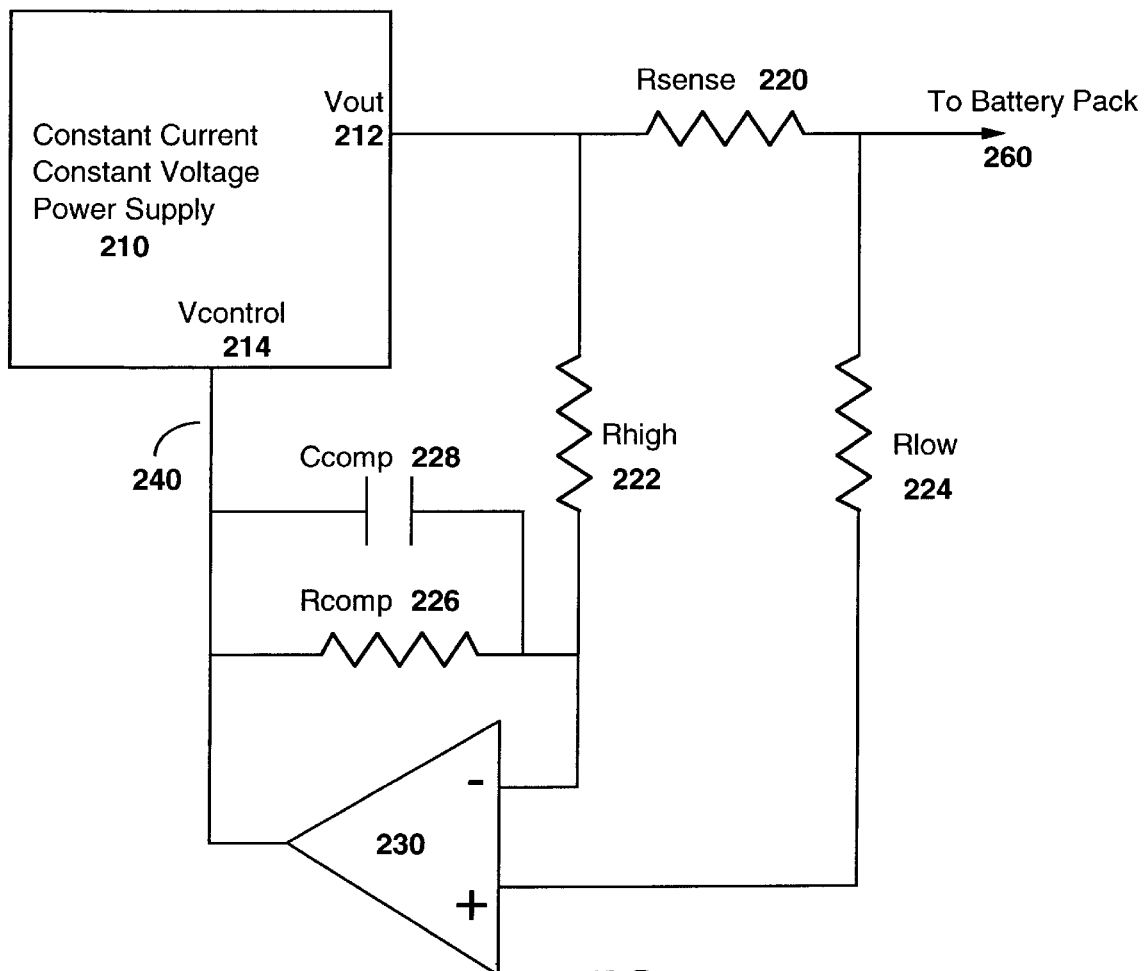
FIG. 2 is a detailed block diagram showing an analog implementation of the invention.

FIG. 2 represents an analog implementation of the monitor and control circuit (122 in FIG. 1) interfaced to a CC-CV power supply 210. The simplest analog implementation for the monitor and control circuit 122 utilizes a small current sensing resistor, Rsense 220, in conjunction with an operational amplifier (op amp) 230 configured as a difference amplifier.

A series resistor Rsense 220 is placed between the CC-CV power supply output 212 and the output of the battery charger 260. Rsense 220 is a precision resistor with an extremely low value of resistance. The precision is required since the voltage measured across Rsense 220 is used to determine the amount of current flowing to the battery pack. The value of Rsense 220 needs to be low otherwise Rsense 220 will introduce an unnecessary amount of voltage drop before the battery pack. Also, a large value of Rsense 220 is not preferable because it will result in excessive power dissipation in the resistor and will require Rsense 220 to be a high power resistor. Therefore Rsense 220 typically is in the range of 0.05–0.10 ohms. If the CC-CV power supply 210 is providing 1 amp of current to the battery pack a 0.10 ohm Rsense 220 will result in a 0.10 volt drop. The corresponding power dissipation in Rsense 220 is 0.10 watts.

In the analog implementation a difference amplifier is connected across Rsense 220. A resistor Rhigh 222 connects the output of the CC-CV power supply 212, or high voltage side of Rsense 220, to the inverting pin of an op amp 230. The value of Rhigh 222 is chosen to minimize the current that will flow through the resistor while allowing for reasonable values of the gain resistor Rcomp 226. The value of Rhigh 222 is one that an amplifier designer of ordinary skill would be able to determine.

Another resistor Rlow 224 connects the output of the battery charger 260, or low voltage side of Rsense 220, to the reference pin of the op amp 230. Rlow 224 is optional but its use is preferable over a direct connection of the reference pin of the op amp 230 to the output of the battery charger 260 since Rlow 224 serves to compensate for bias and offset currents inherent in the op amp 230. Again, the determination of the value of Rlow can readily be made by one of ordinary skill in the field of amplifier design. The connection of Rlow 224 between the output of the battery charger 260 and the reference pin of the op amp 230 serves to establish the voltage at the output of the battery charger 260 as the reference voltage of the op amp 230.

The value of the gain resistor Rcomp 226 is determined according to the predetermined aggregate charging losses (132 in FIG. 1). The ratio of Rcomp 226 to Rhigh 222 is designed to be the same as the ratio of the resistive portion of the aggregate losses to Rsense 220. That is (Rcomp/Rhigh)=(Resistive portion of aggregate losses/Rsense).

Then the output 240 of the op amp 230 is fed back to the control port 214 of the CC-CV power supply 210. Depending on the polarity of the control port 214 an additional amplifier (not shown) may be required to invert the signal about the reference voltage. Design of an amplifier that inverts a signal about the reference voltage is not described as it is within the realm of one of ordinary skill in amplifier design.

Additional elements, such as capacitors, may be added to the op amp 230 circuit to introduce a pole that reduces the bandwidth of the amplifier and slows the loop speed. A single pole can be added to the amplifier with the addition of a single capacitor, Ccomp 228, from the output of the op amp 230 to the inverting pin of the op amp 230. The inclusion of a pole may be preferable to reduce the loop response to instantaneous transients.

The result of the control circuit is to cause the CC-CV power supply 210 to raise its output voltage to compensate for the resistive losses in the charging path. This allows the voltage at the actual battery cells to be maintained at the final top off voltage for a larger portion of the charging time. The charging time is thus optimized.

In an actual implementation of a battery charger within a car kit adapter for a wireless telephone the resistive losses were measured to be 0.66 ohms. An analog monitor and control circuit was used with 1.8 Kohms as the values for Rhigh 222 and Rlow 224. The current sense resistor Rsense 220 was chosen to be 0.05 ohms. Using the above formula, the value of Rcomp 226 can be calculated such that (Rcomp/Rhigh)=(Resistive loss/Rsense). Plugging in the values for Rhigh 222, Rsense 220, and the measured resistive loss, the value of Rcomp 226 is calculated to be 23.76 Kohm. In the actual implementation a standardized resistance value of 24 Kohms was used. Additionally, a capacitance Ccomp 228 of 0.1 $\mu$F was used to insert a pole in the amplifier. Using this analog implementation of the monitor and control circuit, a halving of charging time has been measured over an equivalent non-compensated battery charger.

Figure 3:
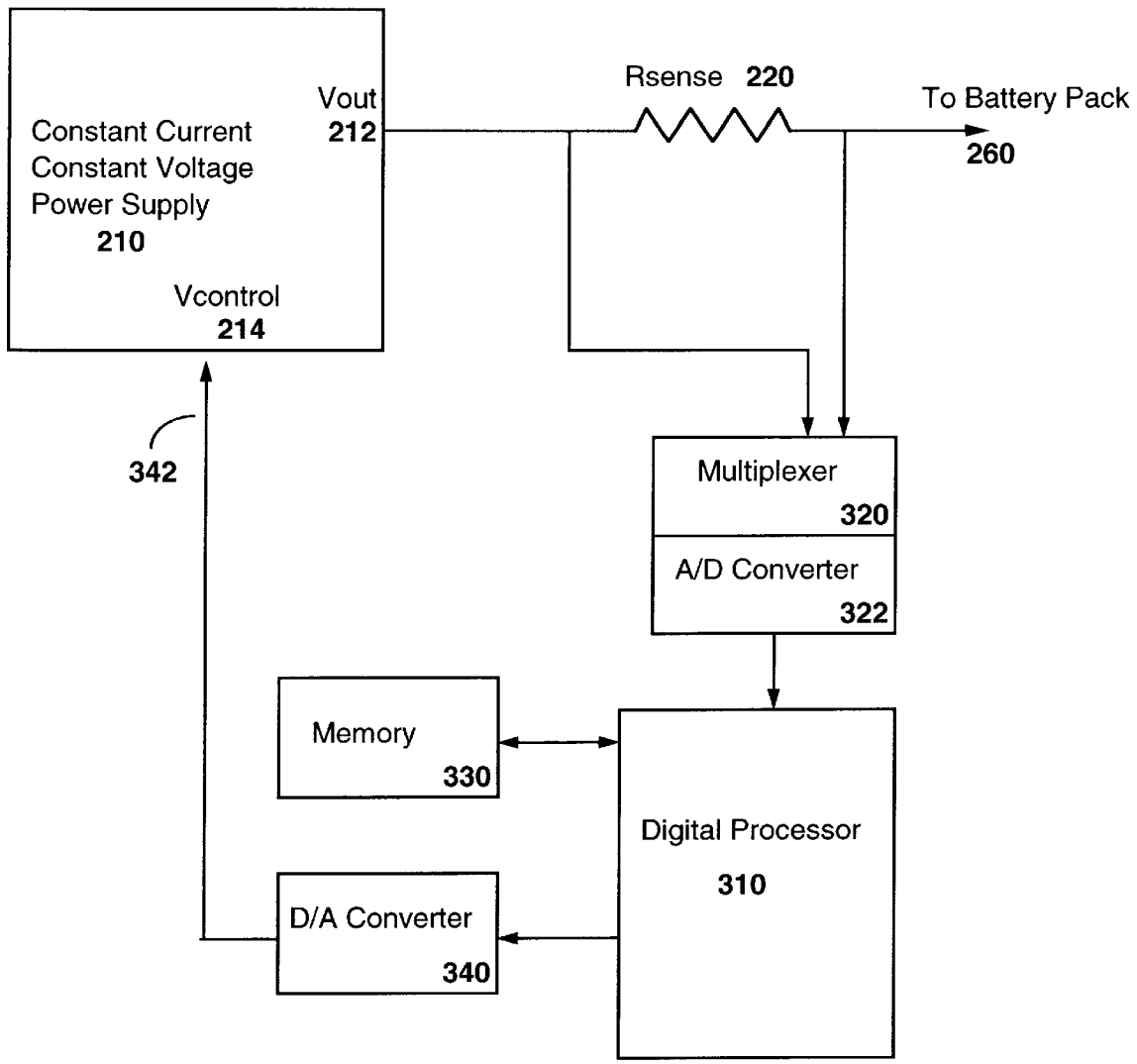
FIG. 3 is a detailed block diagram showing a digital processor based implementation of the invention.

FIG. 3 shows a digital implementation of the control circuit using the same current sensing resistor Rsense 220 and CC-CV power supply 210 depicted in FIG. 2. The digital implementation is more complex and costly than the analog implementation but is able to compensate for non-linear charging losses.

Each side of Rsense 220 is connected to an input port on a multiplexer 320. The voltage on the high voltage and low voltage sides of Rsense 220 are alternately sampled and converted to digital representations using the A/D converter 322. The samples are then input to a digital processor 310. The digital processor compares the sampled voltage values, computes the current through Rsense 220, and determines a compensation value.

The digital processor 310 determines the proper compensation value in conjunction with a predetermined table of charge current to charging loss saved in memory 330. The table could merely represent a look up table of the charging loss.

Once the compensation value has been determined by the digital processor 310 the compensation value is output to a D/A converter 340 where the digital value is converted to a voltage to be input to the control port 214 of the CC-CV power supply.

The digital implementation allows for a greater level of accuracy over an analog implementation. The digital implementation is more resistant to temperature variations and is able to compensate for non-linear charging losses. However, the analog implementation is much simpler, requires minimal power to operate, and is significantly less costly. The actual implementation will be made based on the design trade-offs inherent in any product design.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. An apparatus for optimizing an output of a power supply to compensate for battery charging losses comprising:

a current sensor to determine a charging current supplied by the power supply;

means for determining a compensation value based on the charging current and a predetermined corresponding charging loss;

means for providing the compensation value to a control port on the power supply to adjust the output of the power supply to compensate for the charging losses.

2. An apparatus for optimizing an output of a power supply to compensate for battery charging losses comprising:

a series current sense resistor between the output of the power supply and an input of a charging battery;

means for determining a compensation value based on the voltage across the series current sense resistor and a predetermined corresponding charging loss;

means for providing the compensation value to a control port on the power supply to adjust the output of the power supply to compensate for the charging losses.

3. The apparatus of claim 2 wherein the means for determining a compensation value comprises:

a difference amplifier with a magnitude of gain less than or equal to a ratio of a resistive portion of the battery charging losses to the current sense resistor value.

4. The apparatus of claim 3 wherein the difference amplifier comprises:

an operational amplifier with a reference terminal resistively connected to a low voltage side of the current sense resistor, an inverting terminal resistively connected to a high voltage side of the current sense resistor, and an output terminal resistively connected to the inverting terminal.

5. The apparatus of claim 2 wherein the means for determining a compensation value comprises:

a multiplexer having a first input connected to a high voltage side of the current sense resistor and a second input connected to a low voltage side of the current sense resistor for sampling the voltage values;

an analog to digital (A/D) converter for converting the output of the multiplexer to digital values;

a memory device for storage of a predetermined compensation table having charging loss values corresponding to charging currents; and a digital processor for calculating a current through the current sense resistor based upon the sampled voltage values and for determining the compensation value based on the calculated current and the contents of the predetermined compensation table.

6. The apparatus of claim 5 wherein the means for providing the compensation value comprises:

a digital to analog (D/A) converter which receives the compensation value from the digital processor and converts it to an analog value and outputs the analog value to the control port on the power supply.

7. An apparatus for charging a battery pack comprising:

a power supply having an output and a control port for controlling the output voltage; and a monitor and control circuit for measuring the current being supplied by the power supply to an external load, determining a compensation value based on predetermined compensation measurements, and generating a compensation value to input to the control port on the power supply.

8. The apparatus of claim 7 wherein the predetermined compensation measurements are voltage drops with respect to charging current measured between the power supply output and battery cells within the battery pack.

9. The apparatus of claim 7 wherein the monitor and control circuit comprises:

a current sensor to determine a charging current supplied by the power supply;

means for determining a compensation value based on the charging current and a predetermined corresponding charging loss;

means for providing the compensation value to a control port on the power supply to adjust the output of the power supply to compensate for the charging losses.

10. The apparatus of claim 7 wherein the monitor and control circuit comprises:

a series current sense resistor between the output of the power supply and an input of a charging battery;

means for determining a compensation value based on a voltage across the series current sense resistor and a predetermined corresponding charging loss;

means for providing the compensation value to a control port on the power supply to adjust the output of the power supply to compensate for the charging losses.

11. The apparatus of claim 10 wherein the means for determining a compensation value comprises:

a difference amplifier with a magnitude of gain less than or equal to a ratio of a resistive portion of the battery charging losses to the current sense resistor value.

12. The apparatus of claim 11 wherein the difference amplifier comprises:

an operational amplifier with a reference terminal resistively connected to a low voltage side of the current sense resistor, an inverting terminal resistively connected to a high voltage side of the current sense resistor, and an output terminal resistively connected to the inverting terminal.

13. The apparatus of claim 10 wherein the power supply is a constant current constant voltage power supply.

14. The apparatus of claim 10 wherein the monitor and control circuit comprises:

a multiplexer having a first input connected to a high voltage side of the current sense resistor and a second input connected to a low voltage side of the current sense resistor;

an analog to digital (A/D) converter for converting the output of the multiplexer to digital values;

a memory device for storage of a predetermined compensation table;

a digital processor for calculating a current through the current sense resistor and for determining the compensation value based on the contents of the predetermined compensation table and the magnitude of said current; and a digital to analog (D/A) converter which receives the compensation value from the digital processor and converts it to an analog value and outputs the analog value to the control port on the power supply.

15. A method of adjusting a battery charger output to compensate for charging losses comprising:

characterizing a battery pack charging loss with respect to a charging current;

monitoring the charging current from the battery charger to the battery pack;

determining a compensation value based upon the monitored charging current and the previously characterized battery pack charging loss; and adjusting the battery charger output in accordance with the compensation value.

* * * * *